US008626511B2

(12) United States Patent
LeBeau et al.

(10) Patent No.: US 8,626,511 B2
(45) Date of Patent: Jan. 7, 2014

(54) MULTI-DIMENSIONAL DISAMBIGUATION OF VOICE COMMANDS

(75) Inventors: Michael J. LeBeau, Palo Alto, CA (US); William J. Byrne, Davis, CA (US); Nicholas Jitkoff, Palo Alto, CA (US); Alexander H. Gruenstein, Mountain View, CA (US)

(73) Assignee: Google Inc., Mountain View, CA (US)

( * ) Notice: Subject to any disclaimer, the term of this patent is extended or adjusted under 35 U.S.C. 154(b) by 396 days.

(21) Appl. No.: 12/692,307

(22) Filed: Jan. 22, 2010

(65) Prior Publication Data

US 2011/0184730 A1 Jul. 28, 2011

(51) Int. Cl.
*G10L 21/00* (2013.01)

(52) U.S. Cl.
USPC .............. 704/270; 704/8; 704/9; 704/231; 704/235; 704/275; 715/777; 707/769; 379/45

(58) Field of Classification Search
USPC ........................... 704/270, 275, 257
See application file for complete search history.

(56) References Cited

U.S. PATENT DOCUMENTS

| 5,027,406 | A | * | 6/1991 | Roberts et al. ............... 704/244 |
|---|---|---|---|---|
| 5,712,957 | A | * | 1/1998 | Waibel et al. ............... 704/240 |
| 5,797,123 | A | | 8/1998 | Chou et al. |
| 5,895,466 | A | * | 4/1999 | Goldberg et al. ............... 1/1 |
| 6,021,384 | A | * | 2/2000 | Gorin et al. ............... 704/1 |
| 6,064,959 | A | * | 5/2000 | Young et al. ............... 704/251 |
| 6,453,292 | B2 | * | 9/2002 | Ramaswamy et al. ........ 704/235 |
| 6,513,006 | B2 | * | 1/2003 | Howard et al. ............... 704/257 |
| 6,523,061 | B1 | * | 2/2003 | Halverson et al. ............ 709/202 |
| 6,556,970 | B1 | * | 4/2003 | Sasaki et al. ............... 704/257 |
| 6,587,824 | B1 | * | 7/2003 | Everhart et al. ............... 704/275 |
| 6,629,066 | B1 | * | 9/2003 | Jackson et al. ............... 704/9 |
| 6,633,235 | B1 | * | 10/2003 | Hsu et al. ............... 340/12.28 |
| 6,643,620 | B1 | * | 11/2003 | Contolini et al. ............. 704/270 |
| 6,795,808 | B1 | * | 9/2004 | Strubbe et al. ............... 704/275 |
| 6,839,668 | B2 | * | 1/2005 | Kuo et al. ............... 704/244 |
| 6,839,669 | B1 | * | 1/2005 | Gould et al. ............... 704/246 |
| 6,993,482 | B2 | * | 1/2006 | Ahlenius ............... 704/235 |
| 7,020,609 | B2 | * | 3/2006 | Thrift et al. ............... 704/270.1 |
| 7,099,829 | B2 | * | 8/2006 | Gomez ............... 704/275 |
| 7,315,818 | B2 | * | 1/2008 | Stevens et al. ............... 704/235 |
| 7,437,297 | B2 | * | 10/2008 | Chaar et al. ............... 704/275 |
| 7,447,299 | B1 | * | 11/2008 | Partovi et al. ............. 379/88.01 |
| 7,450,698 | B2 | | 11/2008 | Bushey et al. |
| 7,457,751 | B2 | * | 11/2008 | Shostak ............... 704/251 |

(Continued)

OTHER PUBLICATIONS

European Search Report for European Application No. EP 10 17 5449, mailed Aug. 12, 2011, 3 pages.

*Primary Examiner* — Pierre-Louis Desir
*Assistant Examiner* — Fariba Sirjani
(74) *Attorney, Agent, or Firm* — Fish & Richardson P.C.

(57) ABSTRACT

Methods, systems, and apparatus, including computer programs encoded on a computer storage medium, for processing voice commands. In one aspect, a method includes receiving an audio signal at a server, performing, by the server, speech recognition on the audio signal to identify one or more candidate terms that match one or more portions of the audio signal, identifying one or more possible intended actions for each candidate term, providing information for display on a client device, the information specifying the candidate terms and the actions for each candidate term, receiving from the client device an indication of an action selected by a user, where the action was selected from among the actions included in the provided information, and invoking the action selected by the user.

19 Claims, 7 Drawing Sheets

(56) References Cited

U.S. PATENT DOCUMENTS

| | | | |
|---|---|---|---|
| 7,519,534 B2* | 4/2009 | Maddux et al. | 704/255 |
| 7,555,431 B2* | 6/2009 | Bennett | 704/255 |
| 7,567,907 B2* | 7/2009 | Greene et al. | 704/275 |
| 7,599,838 B2* | 10/2009 | Gong et al. | 704/258 |
| 7,603,360 B2* | 10/2009 | Ramer et al. | 1/1 |
| 7,693,720 B2* | 4/2010 | Kennewick et al. | 704/275 |
| 7,729,920 B2* | 6/2010 | Chaar et al. | 704/275 |
| 7,840,579 B2* | 11/2010 | Samuelson et al. | 707/758 |
| 7,917,368 B2* | 3/2011 | Weinberg et al. | 704/275 |
| 7,949,529 B2* | 5/2011 | Weider et al. | 704/270 |
| 8,065,148 B2* | 11/2011 | Huerta et al. | 704/257 |
| 8,069,041 B2* | 11/2011 | Kuboyama et al. | 704/236 |
| 8,175,887 B2* | 5/2012 | Shostak | 704/275 |
| 8,234,120 B2* | 7/2012 | Agapi et al. | 704/275 |
| 8,239,206 B1* | 8/2012 | LeBeau et al. | 704/275 |
| 8,244,544 B1* | 8/2012 | LeBeau et al. | 704/275 |
| 8,271,107 B2* | 9/2012 | Bodin et al. | 700/94 |
| 8,275,617 B1* | 9/2012 | Morgan et al. | 704/251 |
| 8,296,383 B2* | 10/2012 | Lindahl | 709/206 |
| 8,326,328 B2* | 12/2012 | LeBeau et al. | 455/456.4 |
| 8,380,514 B2* | 2/2013 | Bodin et al. | 704/270 |
| 8,473,289 B2* | 6/2013 | Jitkoff et al. | 704/231 |
| 8,478,590 B2* | 7/2013 | LeBeau et al. | 704/235 |
| 2001/0041980 A1* | 11/2001 | Howard et al. | 704/270 |
| 2002/0049805 A1* | 4/2002 | Yamada et al. | 709/202 |
| 2002/0128843 A1* | 9/2002 | Firman | 704/270 |
| 2002/0143535 A1* | 10/2002 | Kist et al. | 704/251 |
| 2002/0198714 A1* | 12/2002 | Zhou | 704/252 |
| 2003/0093419 A1* | 5/2003 | Bangalore et al. | 707/3 |
| 2003/0149564 A1* | 8/2003 | Gong et al. | 704/246 |
| 2003/0149566 A1* | 8/2003 | Levin et al. | 704/256 |
| 2004/0181747 A1* | 9/2004 | Hull et al. | 715/500.1 |
| 2004/0193420 A1* | 9/2004 | Kennewick et al. | 704/257 |
| 2004/0199375 A1* | 10/2004 | Ehsani et al. | 704/4 |
| 2005/0004799 A1* | 1/2005 | Lyudovyk | 704/254 |
| 2005/0021826 A1* | 1/2005 | Kumar | 709/232 |
| 2005/0283364 A1* | 12/2005 | Longe et al. | 704/257 |
| 2006/0106614 A1* | 5/2006 | Mowatt et al. | 704/275 |
| 2006/0129387 A1* | 6/2006 | Mitchell et al. | 704/201 |
| 2006/0143007 A1* | 6/2006 | Koh et al. | 704/243 |
| 2007/0033043 A1* | 2/2007 | Hyakumoto | 704/255 |
| 2007/0203701 A1* | 8/2007 | Ruwisch | 704/254 |
| 2007/0208567 A1* | 9/2007 | Amento et al. | 704/270 |
| 2007/0239531 A1* | 10/2007 | Beaufays et al. | 705/14 |
| 2008/0221903 A1* | 9/2008 | Kanevsky et al. | 704/275 |
| 2008/0243501 A1* | 10/2008 | Hafsteinsson et al. | 704/235 |
| 2008/0243514 A1* | 10/2008 | Gopinath et al. | 704/270 |
| 2009/0030684 A1* | 1/2009 | Cerra et al. | 704/236 |
| 2009/0030696 A1 | 1/2009 | Cerra et al. | |
| 2009/0094030 A1* | 4/2009 | White | 704/246 |
| 2009/0150156 A1* | 6/2009 | Kennewick et al. | 704/257 |
| 2009/0177461 A1* | 7/2009 | Ehsani et al. | 704/2 |
| 2009/0204410 A1* | 8/2009 | Mozer et al. | 704/275 |
| 2009/0216538 A1* | 8/2009 | Weinberg et al. | 704/275 |
| 2009/0240488 A1* | 9/2009 | White et al. | 704/9 |
| 2009/0248415 A1* | 10/2009 | Jablokov et al. | 704/251 |
| 2009/0306989 A1* | 12/2009 | Kaji | 704/270 |
| 2009/0326936 A1* | 12/2009 | Nagashima | 704/235 |
| 2010/0042414 A1* | 2/2010 | Lewis et al. | 704/270.1 |
| 2010/0049521 A1* | 2/2010 | Ruback et al. | 704/257 |
| 2010/0184011 A1* | 7/2010 | Comerford et al. | 434/321 |
| 2010/0185446 A1* | 7/2010 | Homma et al. | 704/251 |
| 2010/0185448 A1* | 7/2010 | Meisel | 704/256.1 |
| 2010/0232595 A1* | 9/2010 | Bushey et al. | 379/265.02 |
| 2010/0286983 A1* | 11/2010 | Cho | 704/246 |
| 2011/0126146 A1* | 5/2011 | Samuelson et al. | 715/777 |
| 2011/0131045 A1* | 6/2011 | Cristo et al. | 704/249 |
| 2011/0153325 A1* | 6/2011 | Ballinger et al. | 704/235 |
| 2011/0161347 A1* | 6/2011 | Johnston | 707/769 |
| 2011/0166851 A1* | 7/2011 | LeBeau et al. | 704/9 |
| 2011/0166858 A1* | 7/2011 | Arun | 704/243 |
| 2011/0184730 A1* | 7/2011 | LeBeau et al. | 704/201 |
| 2011/0184740 A1* | 7/2011 | Gruenstein et al. | 704/275 |
| 2011/0231191 A1* | 9/2011 | Miyazaki | 704/243 |
| 2011/0246944 A1* | 10/2011 | Byrne et al. | 715/835 |
| 2011/0289064 A1* | 11/2011 | Lebeau et al. | 707/706 |
| 2011/0294476 A1* | 12/2011 | Roth et al. | 455/414.1 |
| 2011/0301955 A1* | 12/2011 | Byrne et al. | 704/251 |
| 2012/0015674 A1* | 1/2012 | LeBeau et al. | 455/456.3 |
| 2012/0022853 A1* | 1/2012 | Ballinger et al. | 704/8 |
| 2012/0023097 A1* | 1/2012 | LeBeau et al. | 707/723 |
| 2012/0035924 A1* | 2/2012 | Jitkoff et al. | 704/235 |
| 2012/0035932 A1* | 2/2012 | Jitkoff et al. | 704/254 |
| 2012/0084079 A1* | 4/2012 | Gruenstein et al. | 704/201 |
| 2012/0245944 A1 | 9/2012 | Gruber et al. | |
| 2012/0310645 A1* | 12/2012 | Gruenstein et al. | 704/235 |
| 2013/0024200 A1* | 1/2013 | Yoon et al. | 704/275 |
| 2013/0041670 A1* | 2/2013 | Morgan et al. | 704/275 |
| 2013/0211815 A1* | 8/2013 | Seligman et al. | 704/2 |

* cited by examiner

MULTI-DIMENSIONAL DISAMBIGUATION OF VOICE COMMANDS

BACKGROUND

This specification relates to search engines.

As the amount of information available on the Internet has dramatically expanded, users have had an increasingly difficult time formulating effective search queries for locating specific, relevant information. In recent years, competition among search engine providers has caused an explosive acceleration in the evolution of search engine algorithms, as well as in the user interfaces that are used to display search results.

Various mechanisms can be used to provide queries to a search engine. For example, a user may type a query explicitly into a search box using a keyboard on a computing device and may then submit the query. Queries may also be implicit, such as by a user panning around a map that is displayed on their computing device, and queries being sent to display annotation information for businesses in the area of the map. In addition, users may enter queries by speaking them, particularly when using mobile devices (e.g., smartphones or app phones) for which keyboards may be small or hands-free operation may be important.

SUMMARY

The proper interpretation of voice commands generally requires that they be disambiguated in at least two dimensions. Disambiguation in the first dimension, referred to by this specification as the "quality of recognition" dimension, involves matching the sounds included in the voice command to terms that the speaker may have spoken. In one example, disambiguation in the quality of recognition dimension may attempt to determine whether, when the speaker issued the voice command with the sounds "kɑː bil" (represented using International Phonetic Alphabet (IPA) phonetic notation), they intended to speak the similar-sounding terms "call bill," "call Phil," "cobble," "cable," "kill bill," "call bull," or "Kabul." This specification refers to the one or more words that are output as a result of performing a speech recognition process on a voice command as "candidate terms."

Disambiguation in the second dimension, referred to by this specification as the "speaker intent" dimension, relates to determining what action the speaker may possibly have intended when they spoke the terms that make up the voice command. For instance, if the speaker is assumed to have spoken the term "call bill" during a voice command, disambiguation in the speaker intent dimension may attempt to determine whether the speaker possibly intended to "call" a first contact named "Bill" or a second contact named "Bill," whether the speaker possibly intended to "call" a contact named "Bill" at home or at work, or whether the speaker is possibly instructing that a "call" should be made to request a "bill" (or "invoice") from a service provider. This specification refers to the actions that the speaker may possibly have intended when they spoke the terms that make up the voice command, as "possible intended actions."

Accordingly, the disambiguation of a voice command in these two dimensions may result in one candidate term that has more than one associated action, such as the case where the single term "call bill" may be associated with the possible intended actions of calling one of two contacts named "Bill." Additionally, the disambiguation of a voice command may result in two or more candidate terms, each with one or more associated actions, such as the case where the same voice command is matched to the term "call bill," to call a contact named "Bill," and to the term "Kabul," to buy a plane ticket to the city of Kabul. In either case, according to one innovative aspect of the subject matter described in this specification, the results of the multi-dimensional disambiguation may be provided to the user for selection, if the ambiguity between the different candidate terms and actions cannot be automatically resolved.

In general, another innovative aspect of the subject matter described in this specification may be embodied in methods that include the actions receiving an audio signal at a server, performing, by the server, speech recognition on the audio signal to identify one or more candidate terms that match one or more portions of the audio signal, identifying one or more possible intended actions for each candidate term, providing information for display on a client device, the information specifying the candidate terms and the actions for each candidate term, receiving from the client device an indication of an action selected by a user, where the action was selected from among the actions included in the provided information, and invoking the action selected by the user. Other embodiments of this aspect include corresponding systems, apparatus, and computer programs, configured to perform the actions of the methods, encoded on computer storage devices.

These and other embodiments may each optionally include one or more of the following features. For instance, the server may be a search engine. An index may be received from the client device, where performing the speech recognition further includes identifying a candidate term in the index that matches the audio signal. The index may be an index of contacts stored by the client device.

In further examples, when a candidate term is a name of a person, one or more of the actions associated with the candidate term may initiate a call, an email, or an instant messaging session with the person. When a candidate term comprises a point of interest (POI), one or more of the actions associated with the candidate term may obtain a map of, directions to, detailed information about, or a distance to the POI. When a candidate term identifies media content, one or more of the actions associated with the candidate term may play, initiate a download for, or obtain detailed information about the media content. One or more of the actions associated with a candidate term may initiate a web search query using the candidate term as a query term. An ambiguity value may be determined for each action, where the ambiguity value associated with the user-selected action may be incremented.

In additional examples, the actions may also include determining that the ambiguity value for a particular action satisfies a threshold, automatically invoking the particular action based on determining that the ambiguity value satisfies the threshold, determining that a user has cancelled the particular action, and decrementing the ambiguity value for the particular action based on determining that the user has cancelled the particular action, where the information is provided based on determining that the user has cancelled the particular action.

In other examples, a speech recognition confidence metric may be determined for each candidate term, where the ambiguity value for each action may be determined based on the speech recognition confidence metric determined for the candidate term associated with the action. A ranking of the actions may be generated based on their respective ambiguity value, where providing the information may further include providing the ranking. The information identifying a particular action may be an icon. Invoking the user-selected application may further include providing, to the client device, information identifying an application stored by the client device.

In general, another innovative aspect of the subject matter described in this specification may be embodied in methods that include the actions of providing an audio signal to a server, by a client device, obtaining information specifying one or more candidate terms that match one or more portions of the audio signal and one or more possible intended actions for each candidate term, receiving a user selection of an action, providing an indication of the user-selected action to the server, and invoking the action selected by the user. Other embodiments of this aspect include corresponding systems, apparatus, and computer programs, configured to perform the actions of the methods, encoded on computer storage devices.

The details of one or more embodiments of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

Like reference numbers represent corresponding parts throughout.

DETAILED DESCRIPTION

Figure 1:
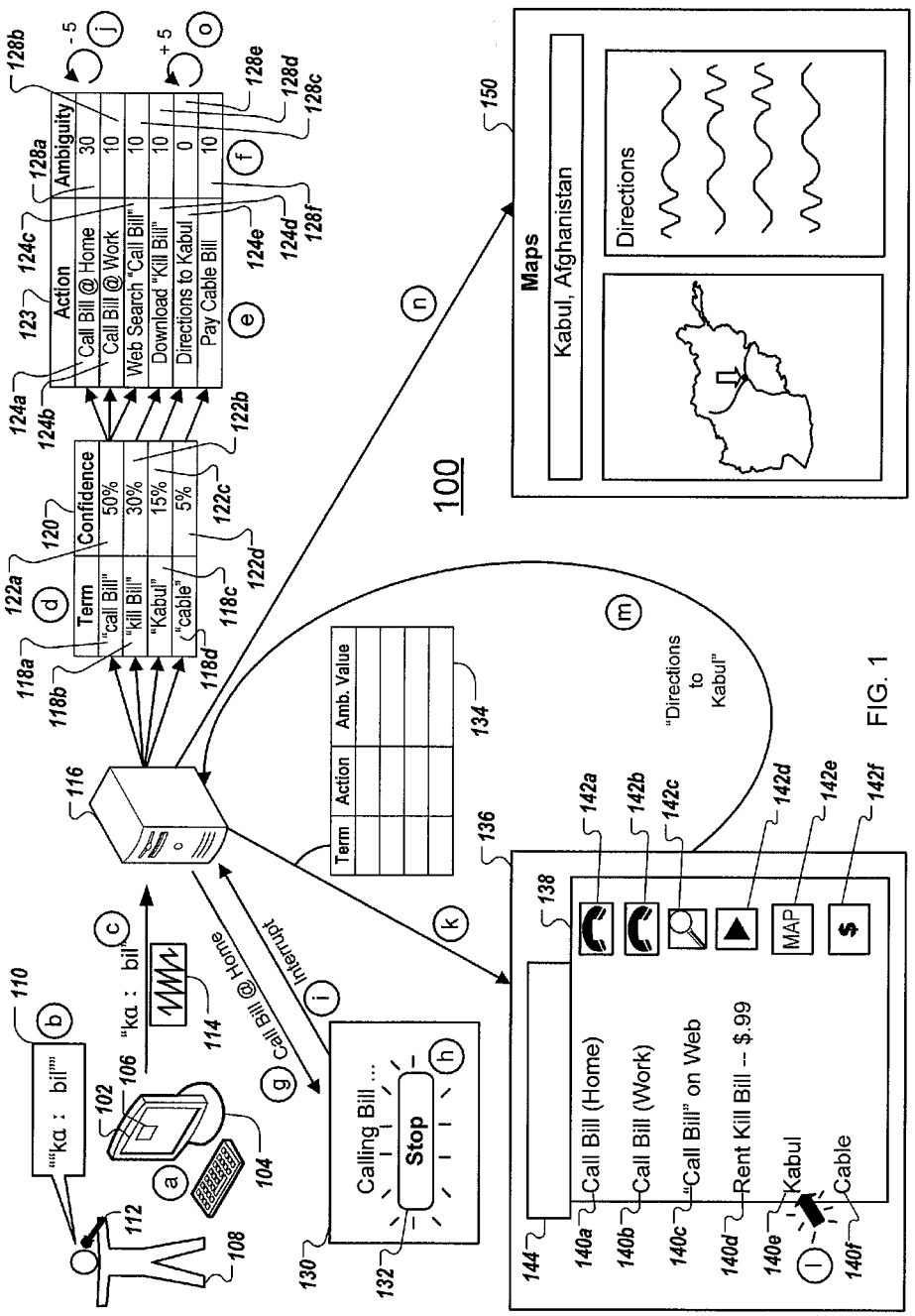
FIG. 1 is a conceptual diagram demonstrating the invocation of an action in response to a voice command.

FIG. 1 is a conceptual diagram of an exemplary framework for performing multi-dimensional disambiguation of voice commands. More particularly, the diagram depicts a client device 104 (e.g., a cellular telephone, a PDA, or a personal computer) and a server 116 that collectively make up an information search system 100, and also depicts both a flow of data between the client device 104 and the server 116, and a user interface of the client device 104 in various states (labeled as user interfaces 102, 130, 136, 150 in time-sequenced states (a), (h), (l) and (n), respectively). The server 116 may be a search engine, or a server used by a search engine to perform speech recognition.

As shown in state (a), a user interface 102 displayed on the client device 104 includes a control 106 that acts as both a search box for receiving query terms, and a command prompt for receiving commands. When the control 106 is implementing search functionality, a user of the client device 104 may initiate a search for information stored on a public or private network by entering a part of a query term, or one or more complete query terms into the control.

When the control 106 is implementing command functionality, the user of the client device may issue any appropriate command, for example a command to instruct the client device 104 to call a contact in the user's contact list, a command to instruct the client device 104 to compose and send electronic communication (e.g., e-mail, instant message, text message) to a contact in their contact list, a command to instruct the client device 104 to play, download, or otherwise interact with various types of media content (e.g., audio, video), or a command to instruct the client device to perform any other type of function. The control 106 thus provides a simplified, intuitive, and powerful user interface for allowing a user to enter or speak multiple types of commands and request multiple types of functionality through a single multi-function command box or prompt.

Unlike a client device that provides different functionalities on different portions of a user interface or on different user interfaces, the client device 104 may implement both a search functionality and a command functionality using the control 106, without requiring the user to first input a navigation function in order to invoke a particular desired functionality. In the case where the client device is a mobile device, such an approach allows the user interface 102 to make the best use of the small screen size, the limited processing capabilities, and the lack of a full keyboard that may exist on the client device 104.

In the example framework illustrated in FIG. 1, terms are input to the control 106 by way of a voice command. In some examples, the user may select a user interface control to activate voice control before speaking voice commands, to allow voice commands to be used to enter terms into the control 106. The control 106 may be a persistent or semi-persistent feature of the user interface 102, for example a search box on a browser toolbar that remains on the user interface 102 as long as the browser is executing, or the user may navigate to the control 106, for example by entering a uniform resource locator (URL) associated with the control 106.

As illustrated in state (b), terms are input to the control 106 using a keyboard or other input mechanism. When voice control is activated, a user 108 may speak sounds 110 into a microphone 112. The user 108 may, for example, press a button on the microphone 112 before speaking, speak the voice command, then release the button on the microphone to initiate the disambiguation process. As another example, the microphone 112 may be embedded into or otherwise installed on the client device 104 and the user 108 may select a user interface control (e.g., an icon of a microphone) before speaking. As yet another example, the microphone 112 may be "on" before the user 108 speaks or may be in an "always-on" state (e.g., the user 108 may simply speak without turning "on" the microphone 112).

The sounds 110 may include one or more phonemes, where a phoneme is the smallest unit of sound employed to form meaningful contrasts between utterances. For example, the sound 110 includes the phonemes "ka:" and "bil". The sounds 110 may represent one of the phrases "call Bill", "kill Bill", "cobble," or "Kabul", to name a few examples.

As illustrated in state (c), an audio signal 114 corresponding to the sounds 110 is provided to a server 116 from the client device 104. For example, the client device 104 may create a sound file or data stream by recording the sounds 110 and may send the sound file over a network, such as the Internet. The server 116 may be one or more server computing devices. Sending audio signals to the search 116 and having the a server 116 voice recognition, command disambiguation, and some or all processing related to command execution may allow for low processing requirements for client device 104. In other example implementations, however, a speech recognition may occur at the client device 104, and the result of the speech recognition are sent to the server 116 instead of the audio signal.

As illustrated in state (d), the server 116 performs a speech recognition process on the received audio signal to identify one or more candidate terms 118a-d that match the audio signal. A term may include one or more words. For example, speech recognition performed on a received sound file that includes a recording of the sounds 110 may identify the candidate terms "call Bill" 118a, "kill Bill" 118b, "Kabul" 118c, and "cable" 118d, as shown in the leftmost column of table 120.

The identification of candidate terms 118a-d may be performed by selecting candidate terms that have a corresponding speech recognition confidence metric above a recognition threshold. For example, a voice recognition process may identify a probability that a candidate term returned by a speech recognition module of the server 116 matches a recorded sound or matches what the user 108 said. The confidence metric reflects a probability; the higher the score, the more likely the candidate term matches the recorded sound.

A threshold, such as a confidence of five percent, may be identified. Candidate terms that satisfy the threshold (e.g., greater than or equal to five percent) may be selected for disambiguation in the speaker intent dimension, and candidate terms that have a confidence that does not satisfy the threshold may be ignored or otherwise excluded from a list of identified candidate terms 118. With a threshold of five percent, the confidence metric values of fifty percent 122a, thirty percent 122b, fifteen percent 122c, and five percent 122d, corresponding to the candidate terms 118a-d, respectively, each satisfy the threshold.

As another example, the N candidate terms having the N highest speech recognition confidence metric values may be identified, where N is a positive integer (e.g., five). The selection of N may be based, for example, on an estimation of the size of the user interface 102, or based on an estimation of the size of the display of a typical mobile device (e.g., as discussed below, candidate terms may be presented on a user interface, and the selection of N may be based on how many candidate terms might fit vertically in a particular or a typical user interface display). As another example, the confidence metrics 122a-d may be selected so that the sum of the confidence metric values 122a-d equals one hundred percent, or sixty percent. Confidence metric values may be adjusted (e.g., increased) for candidate terms that have been historically selected by the user 108 or by users in general. The increase amount may be based on the volume or frequency of historical selections.

Candidate terms may be identified based at least in part on their inclusion in an index or database of data received from a client device. For example, the server 116 may periodically receive an index of contacts from the client device 104. Speech recognition may include recognizing candidate terms that are included in the index and that match a received audio signal. For example, the candidate term "call Bill" 118a may be recognized in part due to the inclusion of the name "Bill" in an index of contacts received from the client device 104. If "Bill" was not included in the client-provided index, the candidate term "call Bill" 118a might not be recognized, may be recognized with a lower confidence metric, or the name "Bill" may be recognized merely as a word that is synonymous with "invoice." Client-provided indices may also include other information, such as information relating to application programs a client device is able to execute, user interface dimensions, media content available on the client device, etc.

As illustrated in state (e) and in table 123, the server 116 identifies one or more actions 124a-e associated with each identified candidate term 118a-d. For example, "call Bill at home" 124a, "call Bill at work" 124b, and "perform a web search for 'Call Bill'" 124c actions may be identified for the "call Bill" candidate term 118a. Other examples include identifying a "download 'Kill Bill' movie" action 124d associated with the "kill Bill" candidate term 118b, identifying a "get directions to Kabul" action 124e associated with the "Kabul" candidate term 118c, and identifying a "pay cable bill" action 124f associated with the "cable" candidate term 118d. Other examples of actions include initiating an email or an instant messaging session with a person based on their name, playing or obtaining detailed information about media content based on the title of the media content, and obtaining a map of, detailed information about, or a distance to a POI, based on the name of the POI.

Where the candidate term does not itself identify an action or command, appropriate actions may be determined using a term/action mapper, or other rule engine. For example, an "initiate contact" action may be selected for a candidate term that includes a name, a "download" action may be selected for a candidate term that identifies media content, a "pay" action may be selected for a candidate term that identifies a business with that the user 108 has a relationship, and a "map" action may be selected for a candidate term that identifies a POI.

As illustrated in state (f), an ambiguity value may be determined for each action, where the ambiguity value represents a likelihood that the user intended the action. For example, ambiguity values of thirty 128a, ten 128b, ten 128c, ten 128d, zero 128e, and ten 128f may be determined for the actions 124a-f, respectively. A high ambiguity value may represent a high confidence of probability that a user intended the associated action. For example, the ambiguity value 128a of thirty may mean that the associated action 124a has a higher probability of being the action the user intended than the action 124b, which has a lower ambiguity value (e.g., ten). In some implementations, a high ambiguity value may indicate that an associated action is highly ambiguous (e.g., not likely to have been intended).

For example, in some implementations the action 124a may be considered less likely to have been intended than the action 124b, based on the ambiguity value of thirty 128a being higher than the ambiguity value of ten 128b. High ambiguity values may be associated with actions that the user or other users of the server 116 have selected in the past. Low ambiguity values may be associated with actions that the user or other users of the server 116 have never selected, or only infrequently selected, in the past. As described more fully below, low ambiguity values may also be associated with actions that the user has cancelled in the past.

Ambiguity values may correlate with speech recognition confidence metrics. For example, a high speech recognition confidence metric may result in a high ambiguity value (e.g., high likelihood of intent) for an associated action, and vice versa. As will be discussed in more detail below, over time, ambiguity values associated with user-selected actions may be incremented and ambiguity values associated with user-canceled actions may be decremented. An initial ambiguity value for an action may be zero if the action has not been selected by the user before or if the corresponding candidate term has not been recognized before for the user.

A total of M actions may be identified, where M is a positive integer (e.g., seven). The selection of M may be based, for example, on an estimation of the size of the user interface 102, or based on an estimation of the size of the display of a typical mobile device (e.g., as discussed below, candidate term/action pairs may be presented on a user interface, and the selection of M may be based on how many candidate term/action pairs might fit vertically in a particular or a typical user interface display). As another example, actions having a corresponding ambiguity value above a threshold (e.g., ten) may be included in the identified actions 124a-e and actions having a corresponding ambiguity value below a threshold may be excluded from the identified actions 124a-e. As yet another example, a maximum number of actions of each type may be included in the identified actions. For instance, in some examples a maximum of three actions of a "call contact" type may be included, even if more than three "call contact" actions might be otherwise identified based on the identified candidate terms.

One or more default actions may be identified for the candidate terms, regardless of whether other types of actions have been identified for a candidate term. For example, every candidate term may have an associated "web search" action. Other default actions that may be identified for a candidate term may include looking up a candidate term in an online dictionary or in an online encyclopedia. For some audio signals, only one action may be identified.

For example, for some audio signals, only one candidate term might be identified and only one default action (e.g., web search) may be identified for the candidate term. For some audio signals, the speech recognition process may be unable to identify any appropriate candidate terms with an acceptable confidence metric, and in some implementations, the server 116 might not identify any actions associated with the unrecognizable audio signal. In other implementations, the server 116 may identify an action for an unrecognized audio signal that may trigger the client device 104 to ask the user to repeat their command.

If the set of ambiguity values indicate that it is highly probable that the user intended a particular action, that action may be automatically invoked, using an "implicit" invocation process. Such a high probability may be established from a high ambiguity value, indicating that the user's intent is quite unambiguous, in either absolute or relative terms. An action may be implicitly invoked if an action has an ambiguity value higher than a threshold (e.g., thirty). As another example, an action having the highest ambiguity value may be implicitly invoked if the highest ambiguity value is at least three times the second highest ambiguity value. As a third example, an action having the highest ambiguity value may be implicitly invoked if the highest ambiguity value is at least four times the second highest ambiguity value and also greater than a threshold (e.g., twenty). In other words, in some implementations, in an example such as where the highest ambiguity value is four and every other ambiguity value is one or less, the action having the highest ambiguity value might not be implicitly invoked even though the highest ambiguity value is at least four times greater than every other ambiguity value, because the highest ambiguity value did not exceed a threshold.

State (g) illustrates the implicit invocation of the particular "call Bill at home" action 124a. The action 124a may be implicitly invoked, for example, due to the associated ambiguity value 124c being above a threshold (e.g., the ambiguity value of thirty may exceed a threshold such as twenty). The server 116 may send metadata to the client device 104 indicating the type of action to invoke (e.g., dial contact) and also the associated candidate term (e.g., the name of the contact, such as "Bill"). In some examples, the server 116 may also send other information, such as the phone number of the contact. In other words, to decrease a wait time for the user 108, the server may send the number to dial to the client device 104 so that the client device 104 does not need to look up the number of the contact. As noted above, phone numbers associated with the contact may be included in an index that is periodically sent from the client device 104 to the server 116.

Information received from the server 116 may trigger the client device 104 to invoke the action 124a. In some examples, the action 124a may be invoked immediately by the client device 104 (e.g., the phone number for Bill may be dialed immediately upon receipt of information from the server 116). In other examples, a window 130 may be displayed on the user interface 102 before the action 124a is invoked. The window 130 may implement a "countdown timer" where the user 108 is presented with a countdown message indicating that the action 124a will be performed when the countdown timer reaches zero. If the user intended to call Bill, the user 108 may let the countdown timer reach zero, and at that point the call to Bill may be invoked.

The amount of time that the countdown timer counts down may be based on the ambiguity value of the associated action. For example, if the ambiguity value 128a indicates that the probability that the user 108 intended the action 124a is high (e.g., seventy five percent), a countdown timer might not be used at all. If the ambiguity value 128a indicates that the probability that the user 108 intended the action 124a is medium (e.g., fifty percent), the countdown timer might start at a small number of seconds (e.g., two) and if the ambiguity value 128a indicates a low probability (e.g., twenty percent), the countdown timer might start at a higher number of seconds (e.g., four). In some implementations, the server 116 determines the countdown timer start value and sends the value to the client device 104.

A cancel control 132 may be included in the window 130 to allow the user 108 to cancel the action 124a before the action 124a is invoked (or, for some actions such as the dialing of a phone number, to cancel the action once it is in progress). As illustrated in state (h), the user 108 did not intend to call Bill, selects the cancel control 132 to cancel the invocation of the action 124a. In response to the selection of the cancel control 132, an interrupt signal may be sent from the client device 104 to the server 116 (as illustrated by state (i)).

In response to receiving the interrupt signal, the server 116 may decrement the ambiguity value for the action 124a, to account for the fact that the action 124a was not the action the user 108 intended. For example, state (j) illustrates a reduction of the associated ambiguity value 128a by a value of five. Decrementing the ambiguity value for an action that the user manually cancels will reduce the chances that the cancelled action will be automatically invoked if a similar sound pattern is spoken in a future voice command.

Also in response to receiving the interrupt signal, the server 116 may send a list 134 of candidate term/action pairs to the client device 104, so that the user 108 can pick the action that was actually intended. The list 134 may also be sent to the client device 134 if none of the ambiguity values 128a-d are above a threshold, or with the metadata that implicitly invokes an action (e.g., in state (g)). In other words, the list 134 may be sent to the client device 104 if none of the ambiguity values 128a-d are high enough to cause an implicit invocation of the associated action. In some implementations, the list 134 is a ranking of the actions 124a-c based on their respective ambiguity values. In other implementations, the list 134 is unranked (e.g., unsorted) when sent by the server 116 and in such examples the list 134 may be subsequently ranked by the client device 104. The term/action pairs may be packaged in another type of data structure instead of a list 116, including a table, database, or an XML file.

Upon receiving the list 134, the client device 104 may display a window 136 on the user interface 102. In some implementations, the server 116 generates code (e.g., HTML (HyperText Markup Language) code) to display the window 136 and sends the code in conjunction with the list 134. The window 136 includes a list 138 that displays list items 140a-f which correspond to the actions 124a-f, respectively. In some implementations, if the user 108 cancels the invocation of an implicit action (e.g., the user 108 may cancel the implicit invocation of the action 124a by selecting the cancel control 132) the list 138 might not include a corresponding list item for the canceled action. For example, the list 138 might not include the list item 140a if the user had canceled the implicit invocation of the action 124a (e.g., in state (h)).

Each list item 140a-f includes a corresponding icon 142a-f. The icons 142a-f indicate the type of action corresponding to the respective list item 140a-f. For example, icons 142a-b indicate that the list items 140a-b correspond to "call contact" actions. The icon 142c indicates that the list item 140c corresponds to a "web search" action. The icon 142d indicates that the list item 140d corresponds to a play movie (e.g., stream, or purchase and download) action. The icon 142e indicates that the list item 140e corresponds to a map or directions action and the icon 142f indicates that the list item 140f corresponds to a "pay bill" action.

The window 136 includes a search box 144, which the user 108 may use to enter or speak a different command or action if the action the user 108 intended is not displayed in the list 138. If the action the user 108 intended is displayed in a corresponding list item 140a-d, the user 108 may select the list item 140a-d that corresponds to the intended action. For example, as illustrated in state (l), the user 108 may select the list item 140e, to indicate that they wish to invoke the corresponding action 124e, to display directions to Kabul. In response to the user selection of a list item 140a-e, the client device 104 sends an indication of the action which corresponds to the selected list item 140a-e to the server 116. For example, state (m) illustrates the sending of an indication to the server 116 that indicates the selection of action 124e corresponding to requesting directions to Kabul. Contrasted with the implicit invocation process of state (g), states (k) and (l) provide for the manual selection of an action, referred to by this specification as an "explicit" invocation process.

In response to receiving the indication of the user-selected action, the server 116 invokes the user-selected action. For some types of actions, such as generating a map or generating directions to a location, processing is done on the server 116 and information used to display the results (e.g., a display image, HTML code) is sent to the client device 104. For example, for the user-selected action 124e, a map of Kabul and directions to Kabul may be generated by a map application running on the server 116. HTML code to display the map and directions may be sent to the client device 104, as illustrated by state (n). The client device may display the generated map and directions in the user interface 102, such as in a window 150.

For some types of actions, the server 116 may send a message to the client device 104 indicating the type of action and possibly metadata relating to the action. Upon receipt of the message, the client device 104 may perform the indicated action. For example, if the user 108 selects list item 140b to indicate a selection of the action 124b to call Bill at work, the server 116 may send a message to the client device 104 indicating that the client device 104 should initiate a call. The message sent from the server 116 to the client device 104 may include Bill's work number.

For some types of actions, invocation of the action involves processing on both the server 116 and the client device 104 (e.g., processing other than simply looking up information or simply displaying information). For example, for an action to play a media title, the server 116 may download the title from a media server, process a credit card transaction, and unlock digital media rights. The server 116 may send the media content to the client device 104. The client device 104 may decode the media content and may play the content.

In response to the user-selection of an action, an associated ambiguity value may be incremented. For example, state (o) illustrates an increase of five for the ambiguity value 128e corresponding to the user-selected action 124e. Over time, an ambiguity value may increase to the point where it is at or above a threshold value such that the associated action may be implicitly invoked if the action is subsequently mapped to a candidate term.

Figure 2:
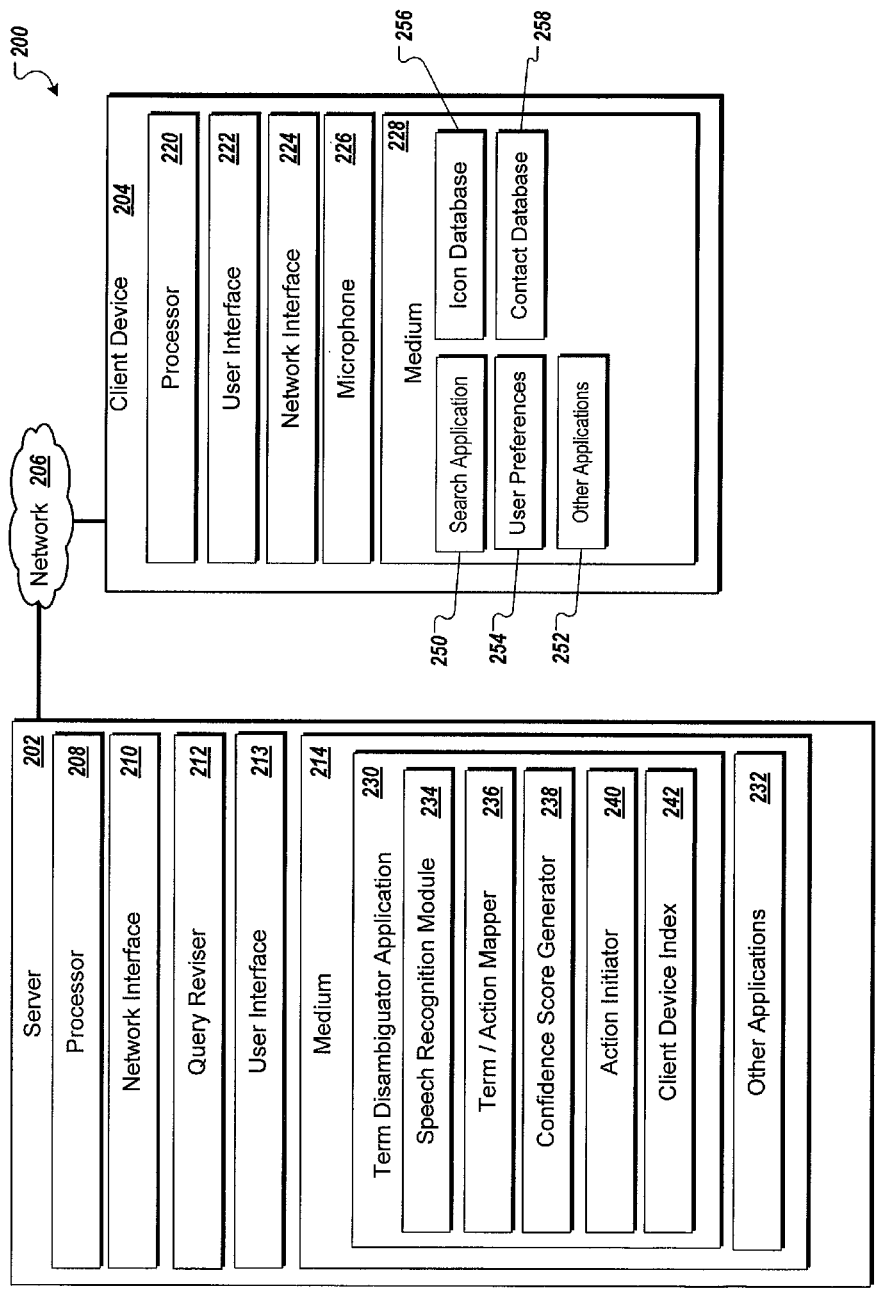
FIGS. 2 and 7 illustrate exemplary systems.

FIG. 2 illustrates an exemplary system 200 that may be used for invoking actions in response to a voice command or other audio signal. The system 200 includes a server 202 connected to one or more client devices 204 over a network 206. The server 202 includes, among other things, one or more processors 208, a network interface 210, a query reviser 212, a user interface 213, and a medium 214. The server 202 may be a search engine, or the server 202 may be used by a search engine to perform speech recognitions. The client device 204 includes one or more processors 220, a user interface 222, a network interface 224, a microphone 226, and a medium 228. The client device 204 may be a mobile phone, a laptop computer, PDA, smart phone, Blackberry™ or other handheld or mobile device. In another implementation, the client device 204 is not portable or mobile, but rather is a desktop computer or a server.

The mediums 214 and 228 store and record information or data, and each may be an optical storage medium, magnetic storage medium, flash memory, or any other appropriate storage medium type. The medium 214 includes a term disambiguator application 230 and possibly one or more other applications 232. The term disambiguator application includes a speech recognition module 234, a term/action mapper 236, a confidence score generator 238, an action initiator 240, and a client device index 242.

The speech recognition module 234 performs speech recognition on a received audio signal to identify one or more candidate terms that match the audio signal. The speech recognition module may determine a speech recognition confidence metric for each identified term which indicates a confidence that the candidate term matches the audio signal. The term/action mapper 236 identifies one or more actions associated with each candidate term. The confidence score generator 238 determines an ambiguity value for each action which represents a likelihood that the user intended the action. The query reviser 212 may adjust ambiguity values, such as increasing ambiguity values for user-selected actions and decreasing ambiguity values for user-canceled actions.

The client-device index 242 may include one or more types of indices received from one or more client devices 204. For example, the server 202 may periodically receive an index of contacts from the client device 204. The speech recognition module 234 may recognize candidate terms that are included in the client-device index 242 and that match a received audio signal. The client-device index 242 may also include other information, such as information relating to application programs the client device 204 is able to execute, user interface dimensions, media content available on the client device 204, etc. The other applications 232 may include, for example, among other applications, a map generator application, a transaction application (e.g., for paying electronic bills or for managing purchasing of media content), and a search application.

The medium 228 includes a search application 250 and possibly one or more other applications 252. The medium 228 also includes user preferences 254, an icon database 256, and a contact database 258. The contact database 258 may include, for example, a list of personal contacts stored on the client device 204. Some or all of the contents of the contact database 258 may be periodically sent to the server 202. The icon database 256 may include icons that indicate particular types of actions. Icons may be displayed next to or along with candidate term/action pairs in a list of suggested candidate term/action pairs presented to the user of the client device 204.

The search application 250 may provide a search user interface to users of the client device 204 which allows users to enter voice commands to perform Internet searches and perform other actions such as dialing contacts, communicating with contacts through email or other electronic communication, making electronic bill payments, getting directions to or other information about a POI, or other actions. The user preferences 254 may include custom threshold values for particular users, such as values which indicate that a user generally intends by voice commands, for example, to call contacts rather than perform web searches, or that the user prefers that a command be invoked immediately rather than use a countdown timer. Other user preferences 254 may indicate that the user prefers that particular types of actions (e.g., dial contact) are invoked automatically or that the user prefers to see suggestions of web search actions presented first in a list of suggested candidate term/action pairs.

The server 202 may be connected to the network 206 and possibly to one or more other networks over the network interface 210. Similarly, the client device 204 may be connected to the network 206 and possibly to one or more other networks over the network interface 224. The network 206 may include, for example, one or more of the Internet, Wide Area Networks (WANs), Local Area Networks (LANs), analog or digital wired and wireless telephone networks (e.g., a PSTN, Integrated Services Digital Network (ISDN), and Digital Subscriber Line (xDSL)), radio, television, cable, satellite, and/or any appropriate other delivery or tunneling mechanism for carrying data services. Networks may include multiple networks or subnetworks, each of which may include, for example, a wired or wireless data pathway.

The processor 208 includes one or more processors and processes operating system or application program computer instructions for the server 202. Similarly, the processor 220 includes one or more processors and processes operating system or application program computer instructions for the client device 204. The user interface 222 displays application user interfaces that include user interface controls for applications that run on the client device 204. For example, the user interface 222 may display an interface for the search application 250. The user interface 213 displays application user interfaces for applications that run on the server 202. For example, the user interface 213 may display an interface for an administrator application that is used to configure, monitor, and invoke the term disambiguator application 230.

Figure 3:
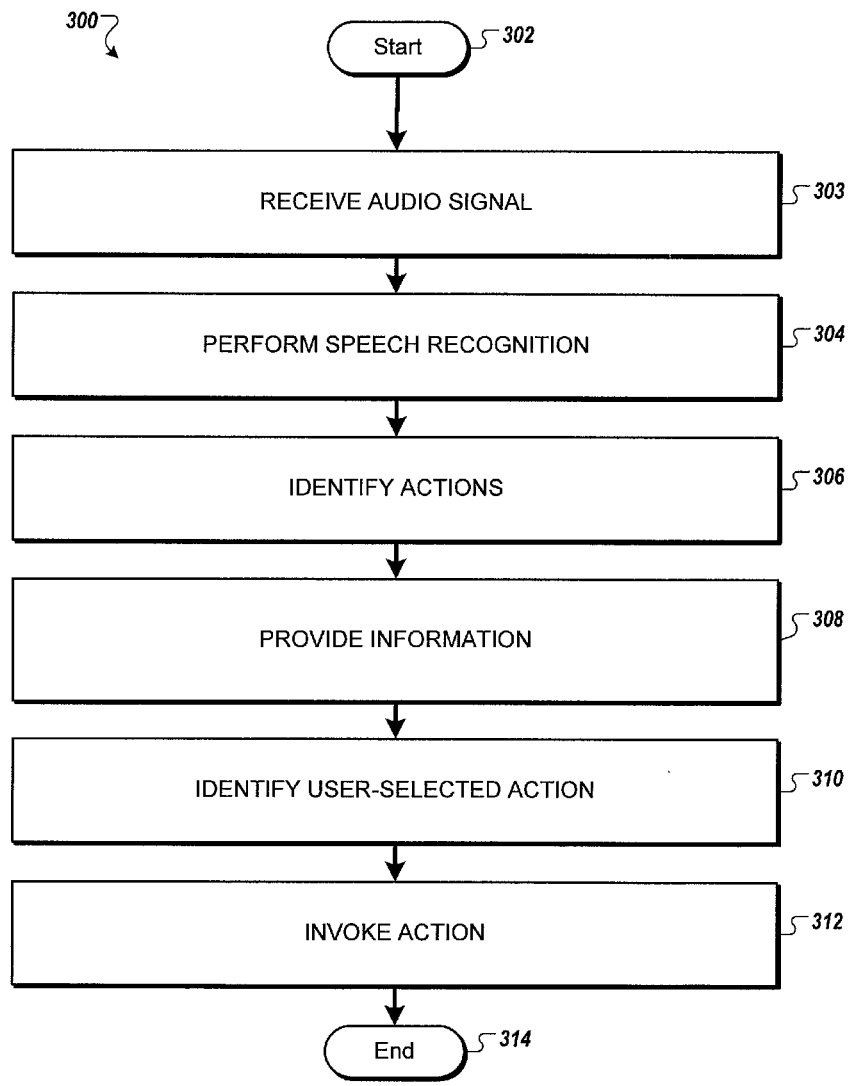
FIGS. 3 and 4 are flowcharts of exemplary processes.

FIG. 3 is a flowchart illustrating a computer-implemented process 300 for invoking an action based on a speech command. Briefly, the process 300 includes: receiving an audio signal at a server, performing, by the server, speech recognition on the audio signal to identify one or more candidate terms that match one or more portions of the audio signal, identifying one or more possible intended actions for each candidate term, providing information for display on a client device, the information specifying the candidate terms and the actions for each candidate term, receiving from the client device an indication of an action selected by a user, where the action was selected from among the actions included in the provided information, and invoking the action selected by the user. Using the process 300, sounds that make up a voice command are disambiguated in at least two dimensions.

In further detail, when the process 300 begins (302), an audio signal is received from a client device by a server (303). The server may receive the audio signal from the client device indirectly, for instance where the client device transmits the audio signal to a search engine that, in turn, transmits the audio signal to the server.

The server performs speech recognition on an audio signal to identify one or more candidate terms which match one or more portions of the audio signal (304). As shown in FIG. 1, the server 116 performs speech recognition on the audio signal 114 to identify the candidate terms 118*a*-*d*. Performing speech recognition may include identifying a candidate term, (e.g., name of a contact) in a client-received index that matches the audio signal.

Speech recognition is used to perform disambiguation of the voice command in the "quality of recognition" dimension. Using speech recognition, the sounds that make up the voice command are matched to terms that the speaker may have spoken. In one example, disambiguation in the quality of recognition dimension may attempt to determine whether, when the speaker issued a voice command, they intended to speak the similar-sounding terms "directions to Paris," "directions to Perris," "direct to Perry's house," "do you reckon two pairs," "door erect chintz toupee wrist," or other possible candidate terms.

One or more possible intended actions are identified for each candidate term (306). For example, as shown in FIG. 1, actions 124*a*-*e* are identified for the associated actions 118*a*-*d*. Actions may include, for example, dialing a contact, performing a web search for the candidate terms, getting directions to a POI, playing media content, or paying an online bill. Other examples of actions include initiating an email or an instant messaging session with a person based on their name, playing or obtaining detailed information about media content based on the title of the media content, and obtaining a map of, detailed information about, or a distance to a POI based on the name of the POI.

Disambiguation in the "speaker intent" second dimension is performed by a module on a client device or server that matches candidate terms to appropriate actions, and obtains an ambiguity value associated with each action. In doing so, the action the speaker may have intended when they spoke the terms that make up the voice command.

Information specifying the candidate terms and the actions for each candidate term are provided for display on a client device (308). For example, a user interface may be displayed on a client device that includes a list of candidate term/action pairs, with icons representing action types next to or included with each candidate term/action pair. The candidate term/action pairs may be ranked and presented in the user interface in an order based on the likelihood that the user intended an action.

For the above-noted "directions to Paris" example, a user interface may provide a user with the option of obtaining directions to Paris, France, Paris, Tex., or Perris, Calif., of determining a route to the home of the user's friend "Perry," to performing a web search with the term "do you reckon two pairs," or to determining show times for the movie "Directions To Paris." If the user lives nowhere near France, Texas, or California but they do have a friend named "Perry," or if their user preferences indicate that they enjoy movies, the route and show time actions may be ranked higher than the directions and web search actions.

A user-selected action is identified, and an indication of the action selected by the user is received (310). The action is selected from among the actions included in the provided information. For example, the user may select a candidate term/action pair in a user interface to indicate that they desire to invoke the selected action. A user may, for example, speak the number "two" to select the second identified action.

The action selected by the user is invoked (312), thereby ending the process 300 (314). For some types of actions, such as generating a map or generating directions to a location, processing is done on a server and information used to display the results (e.g., a display image, HTML code) is sent to a client device. For other types of actions, a server may send a message to a client device indicating a type of action to invoke on the client device and possibly metadata relating to the action. Upon receipt of the message, the client device may perform the indicated action. For example, the client device may initiate a call to a contact. For some types of actions, invocation of the action involves processing on both a server and a client device. For example, for an action to play a media title, a server may download the title from a media server, process a credit card transaction, and unlock digital media rights. The server may send the media content to the client device and the client device may decode and play the media content.

Figure 4:
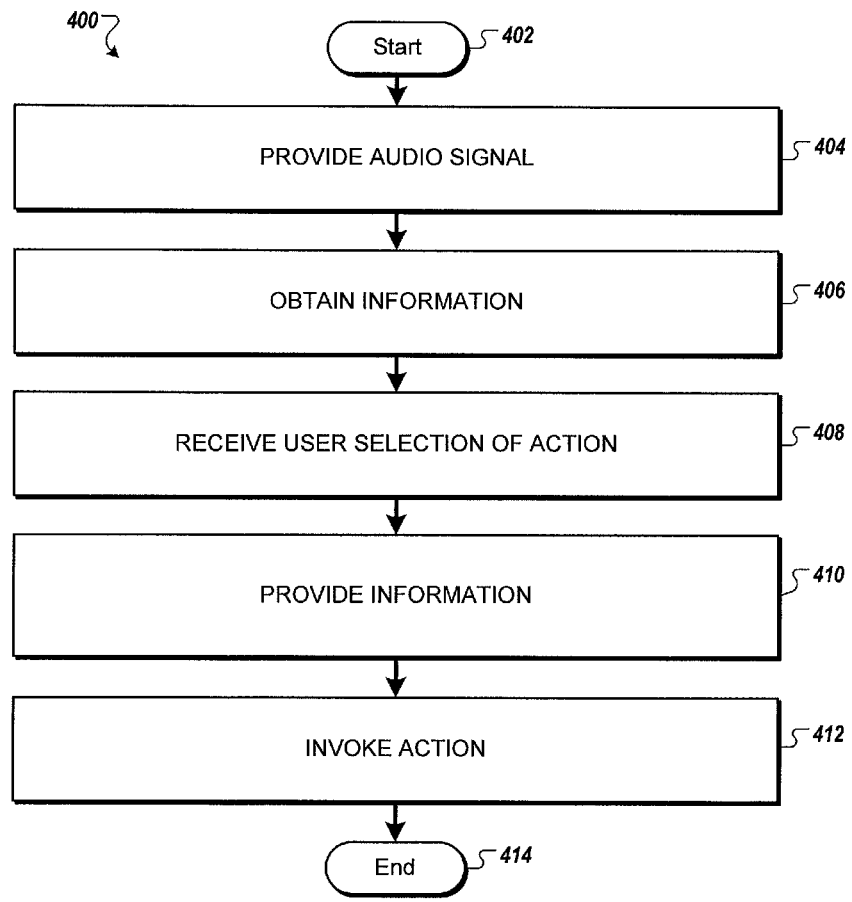

FIG. 4 is a flowchart illustrating a computer-implemented process 300 for invoking an action based on an audio signal. Briefly, the process 400 includes: providing an audio signal to a server, by a client device, obtaining information specifying one or more candidate terms which match one or more portions of the audio signal and one or more possible intended actions for each candidate term, receiving a user selection of an action, providing an indication of the user-selected action to the server, and invoking the action selected by the user.

In further detail, when the process 400 begins (402), an audio signal is provided to a server by a client device (404). For example and as shown in FIG. 1, the client device 104 sends the audio signal 114 to the server 116. The audio signal 114 may be created, for example, by recording a voice command spoken by the user 108 into the microphone 112.

Information identifying one or more candidate terms that match the audio signal and one or more actions associated with each candidate term is obtained (406). For example and as shown in FIG. 1, the server 116 may send the list 134 of candidate term/action pairs to the client device 104. The list 134 may be ranked by ambiguity value, or, in some implementations, the list 134 is unranked.

User selection of an action is received (408). For example, a user may select an action from a list of suggested candidate term/action pairs displayed on a user interface of a client device. For example and as shown in FIG. 1, the user 108 may select the list item 140e corresponding to the "directions to Kabul" action 124e.

Information identifying the user-selected action is provided to the server (S410). For example and as shown in FIG. 1, an indication of the selection of the action 124e may be sent from the client device 104 to the server 116.

The user-selected action is invoked (412), thereby ending the process 400 (414). For some types of actions, such as generating a map or generating directions to a location, processing is done on a server and information used to display the results (e.g., a display image, HTML code) is sent to a client device. For other types of actions, a server may send a message to a client device indicating a type of action to invoke on the client device and possibly metadata relating to the action. Upon receipt of the message, the client device may perform the indicated action. For example, the client device may initiate a call to a contact. For some types of actions, invocation of the action involves processing on both a server and a client device. For example, for an action to play a media title, a server may download the title from a media server, process a credit card transaction, and unlock digital media rights. The server may send the media content to the client device and the client device may decode and play the media content.

Figure 5B:
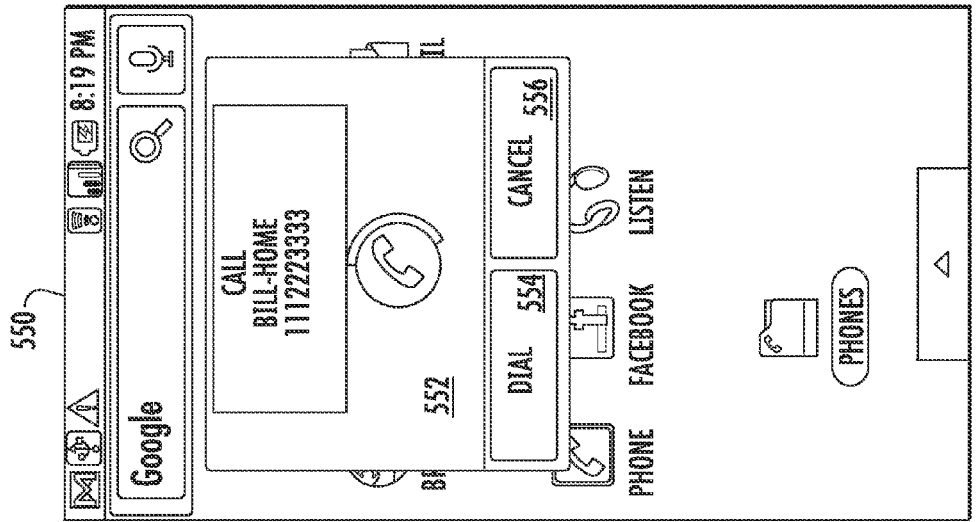
FIGS. 5A-5B and 6A-6B illustrate exemplary user interfaces.
Figure 5A:
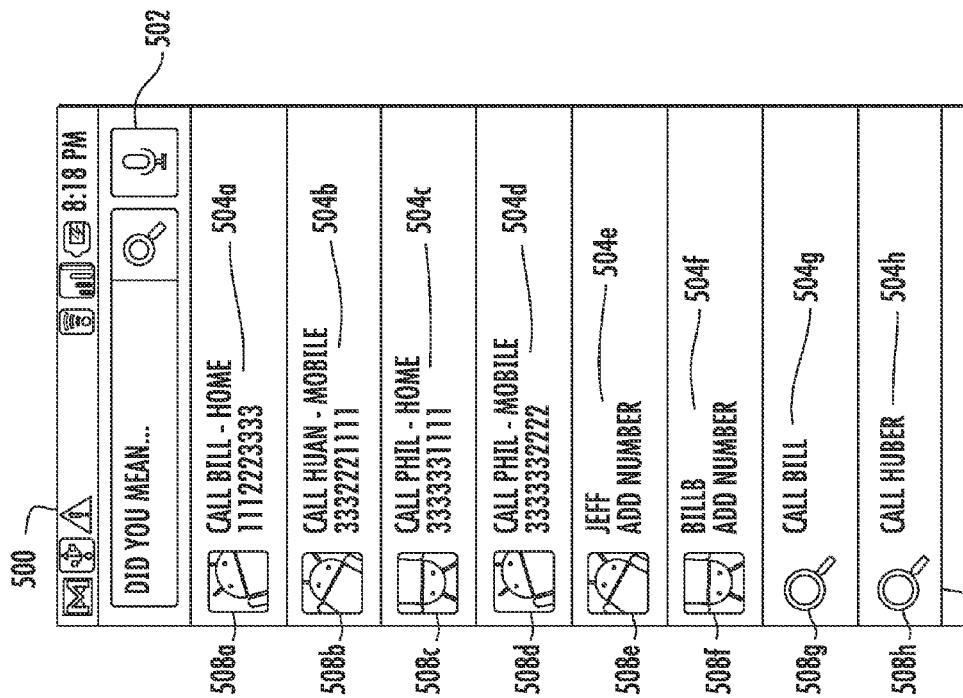

FIGS. 5A-5B and 6A-6B illustrate exemplary user interfaces. FIG. 5A illustrates an example user interface 500 that may be displayed, for example, on a mobile client device. The user interface 500 includes a microphone control 502, that the user may select before speaking a voice command. The user's voice command may be recorded and a corresponding audio signal may be sent to a server. The server may perform speech recognition to identify one or more candidate terms that match the audio signal. The server may also identify one or more actions corresponding to each identified candidate term. The server may send a list of candidate term/action pairs, that may be identified in list items 504a-h in a list area 506 of the user interface 500. In some implementations, the server generates information (e.g., a display image, HTML code) to display the list area 506 and a mobile client device renders the list area 506 using the received information.

The list items 504a-h each include an associated icon 508a-h, respectively. Each of the icons 508a-h indicate an action or a type of action corresponding to the respective list item 504a-h. For example, icons 508a-f, that each include a picture of a corresponding contact, each indicate a "call contact" action type. Icons 508g-h each indicate a "web search" action type. The user may select a list item 504a-h to cause a corresponding action to be invoked. For example, the user may select the list item 504b to call a contact named "Huan" on his mobile phone. As another example, the user may select the list item 504g to initiate a web search for the phrase "call Bill". If the user selects the list item 504e or the list item 504f, the user may be prompted to enter the phone number of the corresponding "Jeff" or "billB" contact, because the mobile client device does not have the phone numbers for those contacts. In response to the user selection of a list item 504a-h, a server may increment an ambiguity value associated with the user-selected action.

FIG. 5B illustrates an example user interface 550. The user interface 550 may be displayed, for example, on a mobile client device if a user selects the list item 504a describe above with reference to FIG. 5A. As another example, the user interface 550 may be displayed if a "call Bill at home" action is implicitly invoked by a server, such as if a "call Bill at home" action is deemed highly probable to be the action that a user intended when speaking a voice command (e.g., the "call Bill at home" action might be a frequently requested action by the user and/or a speech recognition process may have determined a high confidence threshold for identifying a candidate term that was subsequently mapped to the "call Bill at home" action). In some implementations, the "call Bill at home" action may be invoked implicitly without displaying the user interface 550.

The user interface 550 may be displayed by a client device after receipt of a message by a server indicating to the mobile client device to implicitly invoke the "call Bill at home" action. In some examples, the "call Bill at home" action may be initiated immediately by the mobile client device upon display of the user interface 550. In other examples, a window 552 may be displayed on the user interface 550 before the "call Bill at home" action is invoked. In some examples, the "call Bill at home" action is invoked in response to the user selection of a "dial" control 554.

In other examples, the window 552 may implement a "countdown timer" where the user is presented with a countdown message indicating that the "call Bill at home" action will be performed when the countdown timer reaches zero. If the user intended to call Bill, the user may let the countdown timer reach zero, and at that point the call to Bill may be invoked. The user may also select the dial control 554 to invoke the call action before the timer reaches zero. The amount of time that the countdown timer counts down may be based on an ambiguity value of the associated action. For example, if an ambiguity value indicates that the probability that the user intended the "call Bill at home" action is high, a countdown timer might not be used at all. If the ambiguity value indicates that the probability that the user intended the "call Bill at home" action is medium, the countdown timer might start at a small number of seconds (e.g., two) and if the ambiguity value indicates a low probability, the countdown timer might start at a higher number of seconds (e.g., four).

A cancel control 556 may be included in the window 552 to allow the user to cancel the "call Bill at home" action before the call is placed or, for example, to cancel the call if the mobile device has dialed but is waiting for Bill's phone to answer. If the user selects the cancel control 556 to cancel the call to Bill, an interrupt signal may be sent from the mobile client device to a server. In response to receiving the interrupt signal, the server may decrement an ambiguity value for the "call Bill at home" action, to account for the fact that the action was not the action the user intended. Additionally, if the user interface 550 was displayed due to a determination to implicitly invoke the "call Bill at home" action, a server may, in response to the user selecting the cancel control 556, send a list of candidate term/action pairs to the mobile client device, instructing the mobile client device to display the interface 500 described above with respect to FIG. 5A, to allow the user to select the action that they intended to invoke.

Figure 6B:
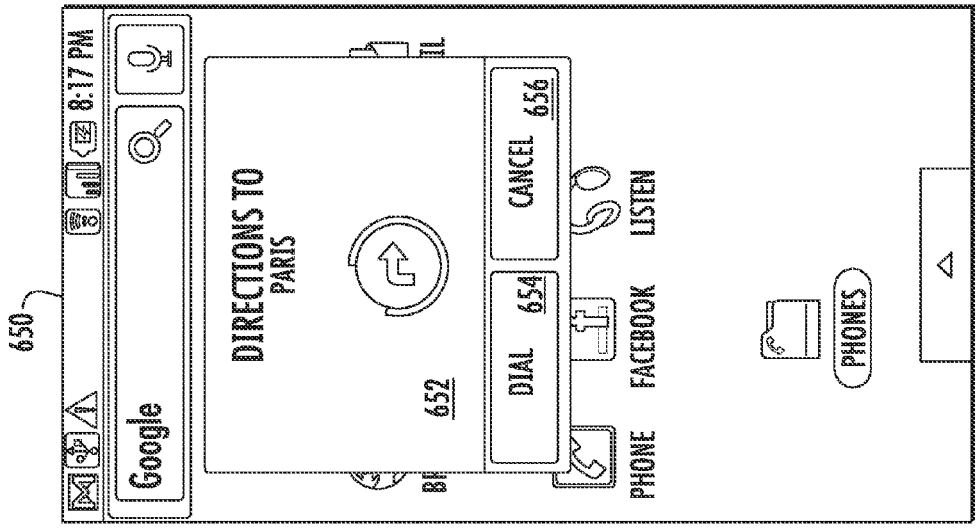
Figure 6A:
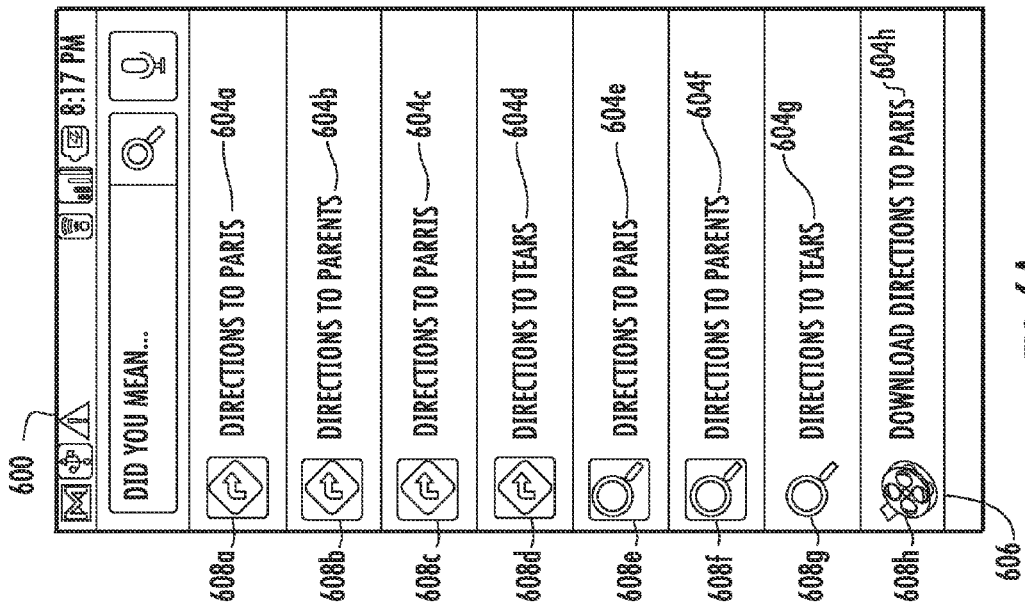

FIG. 6A illustrates an example user interface 600 that may be displayed, for example, on a mobile client device. The user interface 600 may be displayed in response to a server sending a list of candidate term/action pairs corresponding to a set of candidate terms matching an audio signal associated with a voice command sent by the mobile client device to the server. For example, the user of the mobile client device may have spoken the voice command "directions to Paris". The list of received candidate term/action pairs may be used to display list items 604*a-h* in a list area 606 of the user interface 600.

The list items 604*a-h* each include an associated icon 608*a-h*, respectively. Each of the icons 608*a-h* indicate a type of action corresponding to the respective list item 604*a-h*. For example, icons 608*a-d* each indicate a "get directions" action type (e.g., associated with "directions to Paris", "directions to parents", "directions to parris", and "directions to tears" actions, respectively). Icons 608*e-g* each indicate a "web search" action type (e.g., corresponding to web searches for the phrases "directions to Paris", "directions to parents", and "directions to tears", respectively). The icon 608*h* indicates a movie download action type (e.g., associated with a "download 'Directions to Paris' movie" action).

The user may select a list item 604*a-h* to cause a corresponding action to be invoked. For example, the user may select the list item 604*b* to get directions to "parents". As another example, the user may select the list item 604*g* to initiate a web search for the phrase "directions to tears". In response to the user selection of a list item 604*a-h*, a server may increment an ambiguity value associated with the user-selected action.

FIG. 6B illustrates an example user interface 650. The user interface 650 may be displayed, for example, on a mobile client device if a user selects the list item 604*a* describe above with reference to FIG. 6A. As another example, the user interface 650 may be displayed if a "directions to Paris" action is implicitly invoked by a server, such as if a "directions to Paris" action is deemed highly probable to be the action that a user intended when speaking a voice command. The user interface 650 may be displayed by a mobile client device after receipt of a message by a server indicating to the mobile client device to implicitly invoke the "directions to Paris" action. In some examples, the "directions to Paris" action may be initiated immediately by the mobile client device upon display of the user interface 650. In other examples, a window 652 may be displayed on the user interface 650 before the "directions to Paris" action is invoked. In some examples, the "directions to Paris" action is invoked in response to the user selection of a "go" control 654.

In other examples, the window 652 may implement a "countdown timer" where the user is presented with a countdown message indicating that the "directions to Paris" action will be performed when the countdown timer reaches zero. The user may let the countdown timer reach zero, and at that point the action may be invoked. The user may also select the "go" control 654 to invoke the action before the timer reaches zero. A cancel control 656 may be included in the window 652 to allow the user to cancel the "directions to Paris" action before the action is invoked. If the user selects the cancel control 656 to cancel the action, an interrupt signal may be sent from the mobile client device to a server. In response to receiving the interrupt signal, the server may decrement an ambiguity value for the "directions to Paris" action, to account for the fact that the action was not the action the user intended. Additionally, if the user interface 650 was displayed due to a determination to implicitly invoke the "directions to Paris" action, a server may, in response to the user selecting the cancel control 656, send a list of candidate term/action pairs to the mobile client device, instructing the mobile client device to display the interface 600 described above with respect to FIG. 6A, to allow the user to select the action that they intended to invoke.

Figure 7:
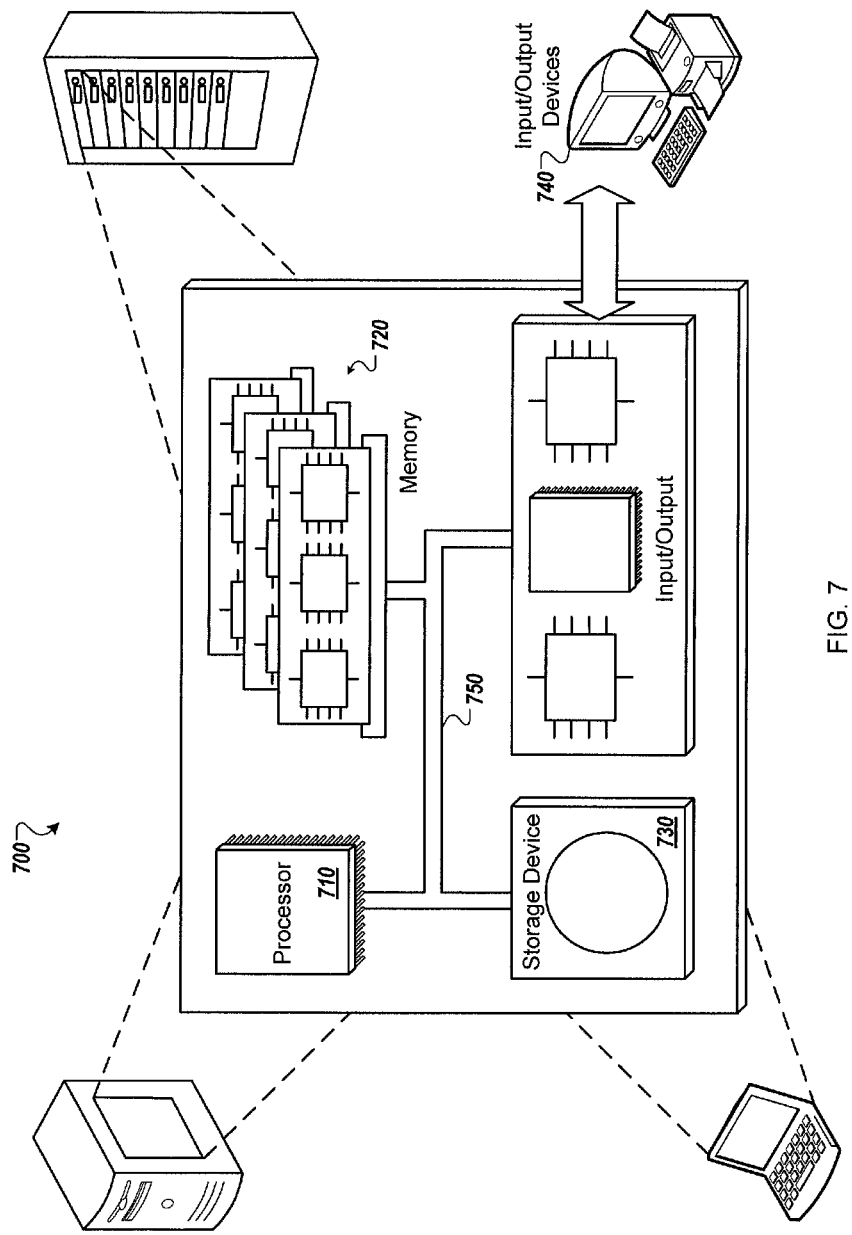

FIG. 7 is a schematic diagram of an example of a generic computer system 700. The system 700 includes a processor 710, a memory 720, a storage device 730, and an input/output device 740. Each of the components 710, 720, 730, and 740 are interconnected using a system bus 750. The processor 710 is capable of processing instructions for execution within the system 700. In one implementation, the processor 710 is a single-threaded processor. In another implementation, the processor 710 is a multi-threaded processor. The processor 710 is capable of processing instructions stored in the memory 720 or on the storage device 730 to display graphical information for a user interface on the input/output device 740.

The memory 720 stores information within the system 700. In one implementation, the memory 720 is a computer-readable medium. In another implementation, the memory 720 is a volatile memory unit. In yet another implementation, the memory 720 is a non-volatile memory unit.

The storage device 730 is capable of providing mass storage for the system 700. In one implementation, the storage device 730 is a computer-readable medium. In various different implementations, the storage device 730 may be a floppy disk device, a hard disk device, an optical disk device, or a tape device.

The input/output device 740 provides input/output operations for the system 700. In one implementation, the input/output device 740 includes a keyboard and/or pointing device. In another implementation, the input/output device 740 includes a display unit for displaying graphical user interfaces.

The features described may be implemented in digital electronic circuitry, or in computer hardware, or in combinations of computer hardware and firmware or software. The apparatus may be implemented in a computer program product tangibly embodied in a machine-readable storage device, for execution by a programmable processor; and method steps may be performed by a programmable processor executing a program of instructions to perform functions of the described implementations by operating on input data and generating output. The described features may be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that may be used, directly or indirectly, in a computer to perform a certain activity or bring about a certain result. A computer program may be written in any appropriate form of programming language, including compiled or interpreted languages, and it may be deployed in any appropriate form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any relevant kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as a CRT (cathode ray tube) or LCD (liquid crystal display) monitor for displaying information to the user and a keyboard and a pointing device such as a mouse or a trackball by that the user may provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any operable combination of them. The components of the system may be connected by any relevant form or medium of digital data communication such as a communication network. Examples of communication networks include, e.g., a LAN, a WAN, and the computers and networks forming the Internet.

The computer system may include clients and servers. A client and server are generally remote from each other and typically interact through a network, such as the described one. The relationship of client and server arises by virtue of computer programs running on the respective computers and having a client-server relationship to each other.

An electronic document (which for brevity will simply be referred to as a document) may, but need not, correspond to a file. A document may be stored in a portion of a file that holds other documents, in a single file dedicated to the document in question, or in multiple coordinated files.

Embodiments of the subject matter and the operations described in this specification may be implemented in digital electronic circuitry, or in computer software, firmware, or hardware, including the structures disclosed in this specification and their structural equivalents, or in combinations of one or more of them. Embodiments of the subject matter described in this specification may be implemented as one or more computer programs, i.e., one or more modules of computer program instructions, encoded on computer storage medium for execution by, or to control the operation of, data processing apparatus.

A computer storage medium may be, or be included in, a computer-readable storage device, a computer-readable storage substrate, a random or serial access memory array or device, or a combination of one or more of them. Moreover, while a computer storage medium is not a propagated signal, a computer storage medium may be a source or destination of computer program instructions encoded in an artificially-generated propagated signal. The computer storage medium may also be, or be included in, one or more separate physical components or media (e.g., multiple CDs, disks, or other storage devices). The operations described in this specification may be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus may include special purpose logic circuitry, e.g., an FPGA (field programmable gate array) or an ASIC (application-specific integrated circuit). The apparatus may also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment may realize various different computing model infrastructures, such as web services, distributed computing and grid computing infrastructures.

A computer program (also known as a program, software, software application, script, or code) may be written in any appropriate form of programming language, including compiled or interpreted languages, declarative or procedural languages, and it may be deployed in any operable form, including as a stand-alone program or as a module, component, subroutine, object, or other unit suitable for use in a computing environment. A computer program may, but need not, correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform actions by operating on input data and generating output. The processes and logic flows may also be performed by, and apparatus may also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any appropriate kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer may be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, embodiments of the subject matter described in this specification may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any relevant form, including acoustic, speech, or tactile input. In addition, a computer may interact with a user by sending documents to and receiving documents from a device that is used by the user; for example, by sending web pages to a web browser on a user's client device in response to requests received from the web browser.

Embodiments of the subject matter described in this specification may be implemented in a computing system that includes a back-end component, e.g., as a data server, or that includes a middleware component, e.g., an application server, or that includes a front-end component, e.g., a client computer having a graphical user interface or a Web browser through which a user may interact with an implementation of the subject matter described in this specification, or any combination of one or more such back-end, middleware, or front-end components. The components of the system may be interconnected by any appropriate form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system may include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) may be received from the client device at the server.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method comprising:
   obtaining two or more candidate transcriptions of a single voice command;
   identifying one or more possible intended actions for each of the two or more candidate transcriptions of the single voice command, including identifying two or more possible intended actions for a particular transcription of the two or more candidate transcriptions of the single voice command;
   providing information for display, the information identifying (i) the two or more candidate transcriptions of the single voice command, and (ii) the one or more possible intended actions for each of the two or more transcriptions of the single voice command, including the two or more possible intended actions for the particular transcription;
   receiving, by one or more computers, data indicating a selection of a particular possible intended action from among the displayed one or more possible intended actions for each of the two or more transcriptions of the single voice command, and the displayed two or more possible intended actions for the particular transcription; and
   invoking the selected particular possible intended action.

2. The method of claim 1, wherein, when the particular transcription comprises a name of a person, the two or more possible intended actions for the particular transcription includes two or more of (i) an action that initiates a call, (ii) an action that initiates an email, and (iii) an action that initiates an instant messaging session with the person.

3. The method of claim 1, wherein, when the particular transcription comprises a point of interest (POI), the two or more possible intended actions for the particular transcription includes two or more of (i) an action that obtains a map of the POI, (ii) an action that obtains directions to the POI, (iii) an action that obtains detailed information about the POI, and (iv) an action that obtains a distance to the POI.

4. The method of claim 1, wherein, when the particular transcription identifies media content, the two or more possible intended actions for the particular transcription includes two or more of (i) an action that plays the media content, (ii) an action that initiates a download for the media content, and (iii) an action that obtains detailed information about the media content.

5. The method of claim 1, wherein the two or more possible intended actions for the particular transcription includes an action that initiates a web search query using the particular transcription as a query term.

6. The method of claim 1, further comprising determining an ambiguity value for each of the one or more possible intended actions for the particular transcription and for each of the two or more possible intended actions for the particular transcription, wherein an ambiguity value reflects a server-determined level of certainty that the user actually intended to perform a possible intended action.

7. The method of claim 6, further comprising:
responsive to receiving data indicating the selection of the particular possible intended action, incrementing the ambiguity value associated with the particular possible intended action.

8. The method of claim 6, further comprising:
determining that the ambiguity value for the particular possible intended action satisfies a threshold;
automatically invoking the particular possible intended action based on determining that the ambiguity value satisfies the threshold;
determining that a user has cancelled the particular possible intended action; and
decrementing the ambiguity value for the particular possible intended action based on determining that the user has cancelled the particular possible intended action.

9. The method of claim 6, further comprising:
generating a ranking of the one or more possible intended actions for each of the two or more candidate transcriptions and the two or more possible intended actions for the particular transcription based on their respective ambiguity values,
wherein providing the information further comprises providing the ranking.

10. The method of claim 1, wherein the information specifying the particular possible intended action comprises an icon.

11. The method of claim 1, wherein invoking the selected particular possible intended action comprises providing data specifying an application that is stored by a client device.

12. A system comprising:
one or more computers; and
a computer-readable medium coupled to the one or more computers having instructions stored thereon which, when executed by the one or more computers, cause the one or more computers to perform operations comprising:
obtaining two or more candidate transcriptions of a single voice command;
identifying one or more possible intended actions for each of the two or more candidate transcriptions of the single voice command, including identifying two or more possible intended actions for a particular transcription of the two or more candidate transcriptions of the single voice command;
providing information for display, the information identifying (i) the two or more candidate transcriptions of the single voice command, and (ii) the one or more possible intended actions for each of the two or more transcriptions of the single voice command, including the two or more possible intended actions for the particular transcription;
receiving data indicating a selection of a particular possible intended action from among the displayed one or more possible intended actions for each of the two or more transcriptions of the single voice command, and the displayed two or more possible intended actions for the particular transcription; and
invoking the selected particular possible intended action.

13. The system of claim 12, wherein, when the particular command transcription comprises a name of a person, the two or more possible intended actions for the particular transcription includes two or more of (i) an action that initiates a call, (ii) an action that initiates an email, and (iii) an action that initiates an instant messaging session with the person.

14. A computer-implemented method comprising:
obtaining information specifying two or more displayed candidate transcriptions of a single voice command and one or more displayed possible intended actions for each of the two or more displayed candidate transcriptions of the single voice command, including two or more displayed possible intended actions for a particular transcription of the two or more displayed candidate transcriptions of the single voice command;
receiving data indicating a selection of a particular displayed possible intended action from among the one or more possible displayed intended actions for each of the two or more transcriptions of the single voice command and the two or more possible displayed intended actions for the particular transcription;
providing data indicating the selection of the particular displayed possible intended action to a server; and
invoking the selected particular displayed possible intended action.

15. The method of claim 14, comprising transmitting an index of contacts to the server.

16. The method of claim 14, comprising:
determining an ambiguity value for each of the one or more displayed possible intended actions for each of the two or more displayed candidate transcriptions and for each of the two or more displayed possible intended actions for the particular transcription;
determining that the ambiguity value for the particular displayed possible intended action satisfies a threshold;
automatically invoking the particular displayed possible intended action based on determining that the ambiguity value satisfies the threshold;
determining that the user has cancelled the particular displayed possible intended action; and
decrementing the ambiguity value for the particular displayed possible intended action based on determining that the user has cancelled the particular displayed possible intended action.

17. A non-transitory computer storage medium encoded with a computer program, the program comprising instructions that when executed by data processing apparatus cause the data processing apparatus to perform operations comprising:
obtaining information specifying two or more displayed candidate transcriptions of a single voice command and one or more displayed possible intended actions for each of the two or more displayed candidate transcriptions of the single voice command, including two or more displayed possible intended actions for a particular transcription of the two or more displayed candidate transcriptions of the single voice command;
receiving data indicating a selection of a particular displayed possible intended action from among the one or more possible displayed intended actions for each of the two or more transcriptions of the single voice command and the two or more possible displayed intended actions for the particular transcription;
providing data indicating the selection of the particular displayed possible intended action to a server; and
invoking the selected particular displayed possible intended action.

18. The medium of claim 17, wherein the operations further comprise transmitting an index of contacts to the server.

19. The medium of claim 17, wherein the operations further comprise:

determining an ambiguity value for each of the one or more displayed possible intended actions for each of the two or more displayed candidate transcriptions and for each of the two or more displayed possible intended actions for the particular transcription;
determining that the ambiguity value for the particular displayed possible intended action satisfies a threshold;
automatically invoking the particular displayed possible intended action based on determining that the ambiguity value satisfies the threshold;
determining that the user has cancelled the particular displayed possible intended action; and
decrementing the ambiguity value for the particular displayed possible intended action based on determining that the user has cancelled the particular displayed possible intended action.

* * * * *

UNITED STATES PATENT AND TRADEMARK OFFICE
CERTIFICATE OF CORRECTION

PATENT NO.         : 8,626,511 B2                                            Page 1 of 1
APPLICATION NO.    : 12/692307
DATED              : January 7, 2014
INVENTOR(S)        : Michael J. LeBeau et al.

It is certified that error appears in the above-identified patent and that said Letters Patent is hereby corrected as shown below:

In the Claims:

Column 21, line 65, Claim 13, before "transcription" please delete "command".

Signed and Sealed this
Twenty-ninth Day of April, 2014

Michelle K. Lee
*Deputy Director of the United States Patent and Trademark Office*

UNITED STATES PATENT AND TRADEMARK OFFICE
CERTIFICATE OF CORRECTION

Page 1 of 1

PATENT NO.       : 8,626,511 B2
APPLICATION NO.  : 12/692307
DATED            : January 7, 2014
INVENTOR(S)      : LeBeau et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 404 days.

Signed and Sealed this
Fifth Day of May, 2015

Michelle K. Lee
*Director of the United States Patent and Trademark Office*